United States Patent [19]

Kruse et al.

[11] Patent Number: 5,072,821

[45] Date of Patent: Dec. 17, 1991

[54] ESCALATOR/PEOPLE MOVER BEARING

[75] Inventors: Michael Kruse, Minden; Hans-Dietrich Riedel, Berlin, both of Fed. Rep. of Germany

[73] Assignee: Otis Elevator Company, N.J.

[21] Appl. No.: 624,006

[22] Filed: Dec. 7, 1990

[51] Int. Cl.⁵ .............................................. B66B 23/12
[52] U.S. Cl. ................................... 198/327; 384/273; 384/391; 384/295; 198/333
[58] Field of Search ................. 198/327, 333; 384/273, 384/295, 391

[56] References Cited

U.S. PATENT DOCUMENTS

| | | | |
|---|---|---|---|
| 2,214,580 | 9/1940 | Dunlop | 198/333 |
| 3,789,972 | 2/1974 | Kraft | 198/333 X |
| 4,017,127 | 4/1977 | Smith et al. | 384/295 X |
| 4,426,162 | 1/1984 | Tsuchiya et al. | 384/295 X |
| 4,519,490 | 5/1985 | White | 198/333 |
| 4,653,344 | 3/1987 | Nelson | 384/295 X |
| 4,909,638 | 3/1990 | Muto | 384/273 |

Primary Examiner—D. Glenn Dayoan
Attorney, Agent, or Firm—Lloyd D. Doigan

[57] ABSTRACT

An escalator or people mover having steps or pallets which are supported by axles that are driven by a step chain, utilize a split bearing disposed between the axle and the step or pallet. The split bearing allows for rapid replacement of a worn bearing. The split bearing has a shaped outer portion for cooperating with the step or pallet to prevent rotation of the bearing relative to the step.

6 Claims, 2 Drawing Sheets

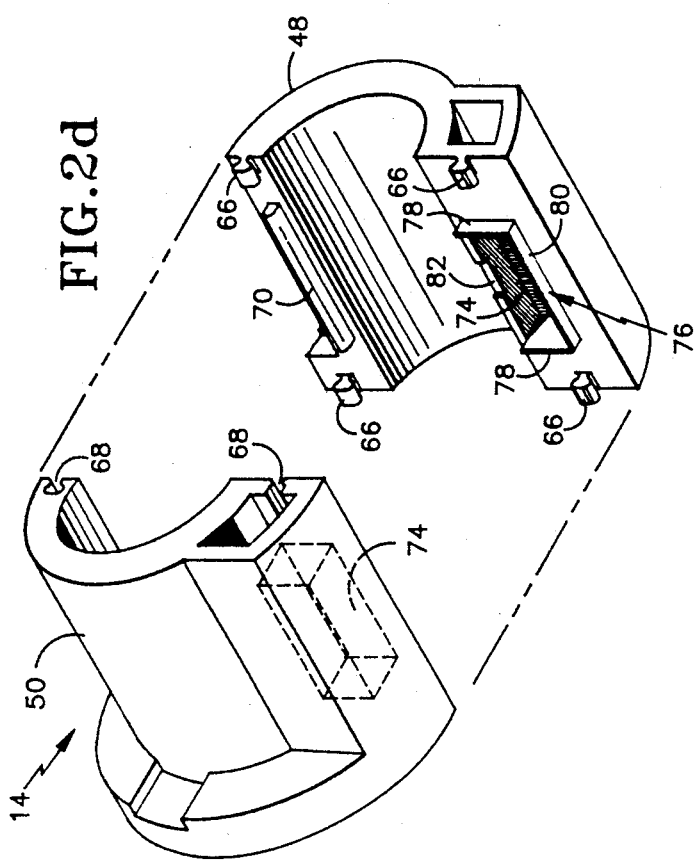
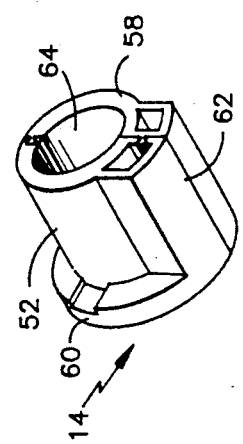
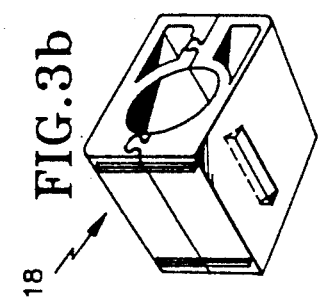
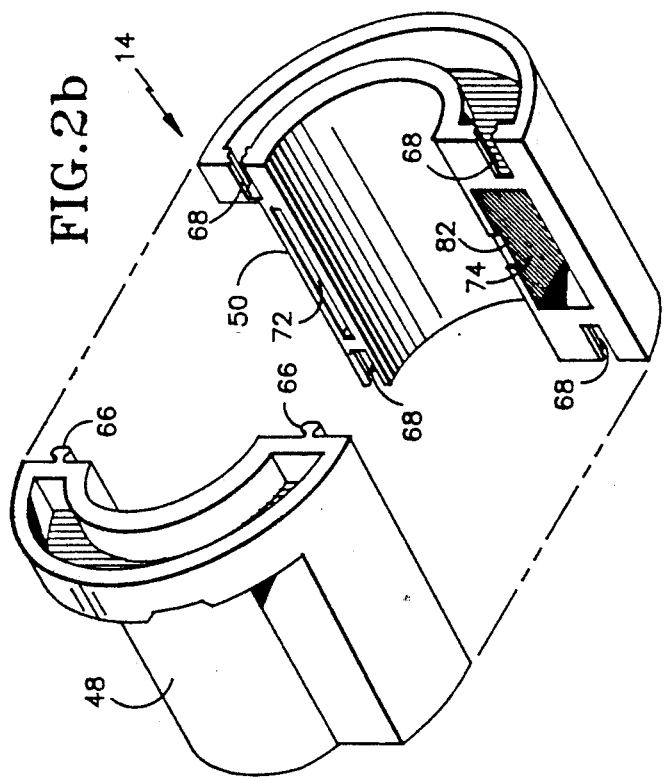
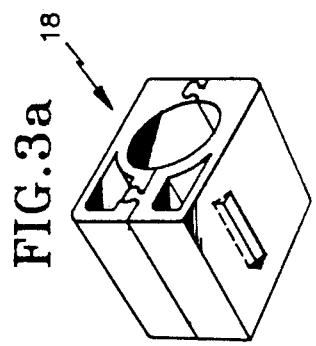
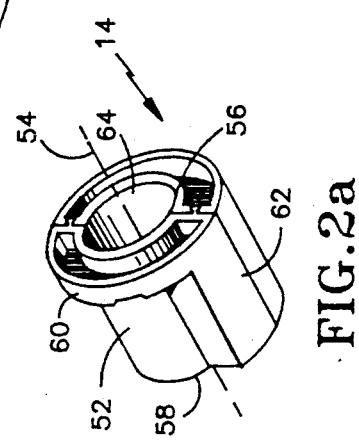

ESCALATOR/PEOPLE MOVER BEARING

DESCRIPTION

1. Technical Field

This invention relates to escalators and people movers and more particularly to a bearing for use with a step or pallet of an escalator or people mover.

2. Background Art

Escalators and horizontal transportation machines, such as people movers, utilize steps or pallets for carrying passengers. The step or pallet is supported and driven by an axle. Each end of the axle attaches to a driven chain which follows a roughly elliptical path. Because of the shape of the path, the step or pallet rotates relative to the axle. A bearing is disposed between the axle and the step or pallet to protect relatively moving parts from wear.

Some bearings take the form of a bushing which is secured against rotational movement relative to the step or pallet by a pin. Some bushings may not be secured against rotation relative to the step. A relatively rotating bushing is inferior because the surface of the pallet or step abutting the bushing is generally not machined to a high degree. As a result, wear upon the outer surface of the bearing is uneven and rapid.

Such prior art bearings are undesirable due to the difficulty in replacing worn or damaged bearings. The chain and axle must be disassembled, the bearing removed from the step and the axle, a new bearing disposed about the axle and inserted between the axle and the step, and the axle reattached to the chain. Down time for service of the escalator or people mover may be excessive and costly.

Therefore, a new bushing for an axle used in an escalator, people mover, or the like, is sought.

DISCLOSURE OF THE INVENTION

It is the object of the invention to provide a step axle bearing which can be easily replaced.

It is a further object of the invention to provide a step axle bearing which has low friction properties.

It is a further object of the invention to provide a bushing which does not rotate relative to the step or pallet.

According to the invention, a split bearing for use between an escalator step or people mover pallet, or the like, has a shaped outer portion for engaging the escalator step or people moving pallet, the shape cooperating with the people mover pallet or escalator step for preventing rotation of the bearing relative to the step.

According to a feature of the invention, the bearing has a cavity disposed therein for holding lubrication to lubricate the bearing.

Other features and advantages of the present invention will be apparent from the specification and claims from the accompanying drawings which illustrate an embodiment of the invention.

DESCRIPTION OF THE DRAWINGS

FIG. 2a is a perspective front view of a first bearing of FIG. 1;

FIG. 2b is a perspective front view of the two halves of the bearing of FIG. 2a;

FIG. 2c is a perspective rear view of the two halves of the bearing of FIG. 2a;

FIG. 2d is a perspective rear view, partially in section, of the two halves of the bearing of FIG. 2a;

FIG. 3a is a perspective front view of a second bearing of FIG. 1;

FIG. 3b is a perspective rear view of the second bearing of FIG. 3a.

BEST MODE FOR CARRYING OUT THE INVENTION

Figure 1:
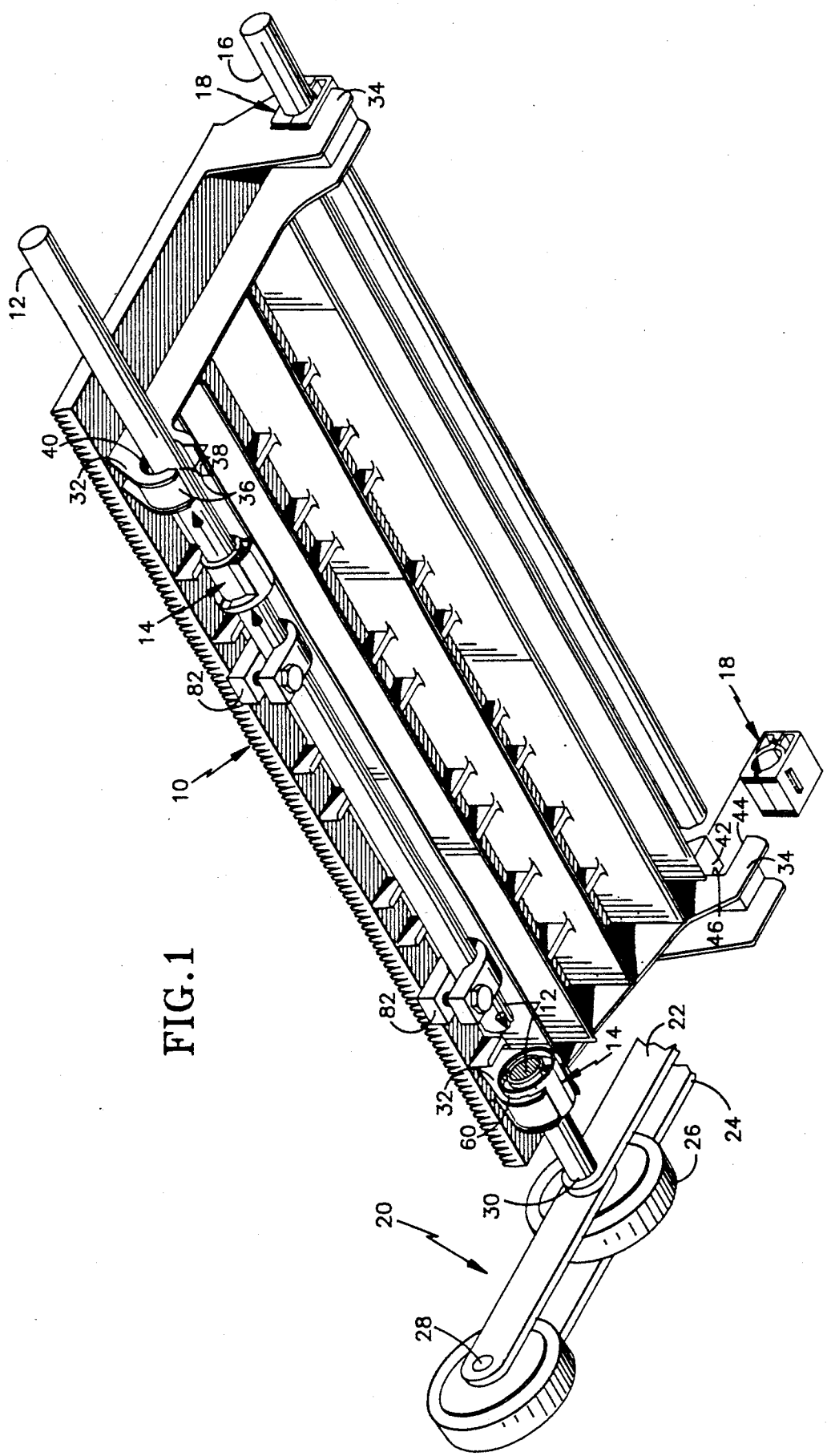
FIG. 1 is a perspective view of an underside of a people mover pallet attached to a step axle by an embodiment of a bearing of the invention.

Referring to FIG. 1, a people mover pallet 10 is attached to a first step axle 12 by a pair of front bushings 14 and to a second step axle 16 by a pair of rear bushings 18. Typically the axles are driven by a pair of chains (only one of which, 20, is shown) supporting the axles 12 and 16 which are disposed therebetween. The chain 20 is comprised of a plurality of segments having an inner link 22, an outer link 24, a cog 26 and either a pin axle 28, or a continuation 30 of the step axle. The chain, as one of ordinary skill in the art will readily appreciate, may take other forms such as a belt or other concatenation. The pin axle and the continuation connect the segments of the chain together as is known in the art. The axles support and drive the pallet 10 as will be discussed, infra.

As one of ordinary skill in the art will readily appreciate, such an arrangement might be used with a step in an escalator or other people mover. For ease of discussion herein, the following description describes bushings for use with a people mover pallet. However, it is understood that such description readily describes bushings for use with an escalator or the like.

Typically the chain 20 travels along a closed path about a first sprocket and a second sprocket (not shown). Either of the first or second sprocket may provide motive force to the chain as is known in the art. The chains carry the axles 12, 16 and the pallet 10 thereby, along the closed path. As one of ordinary skill will readily appreciate, the pallet follows the path and necessarily rotates relative to the axles as the pallet travels about the first and second sprocket. The pallet 10 has a pair of forward supports 32 and a pair of rear supports 34 depending therefrom. The rear supports are disposed on an axially outer position on each step axle relative to the forward supports. As a result, each step axle supports the forward supports of one pallet and the rear supports of a second pallet (not shown). The rear supports 34 of one pallet are disposed between the forward supports 32 of another pallet and the inner link 22 of the step chain 20.

The forward supports 32 each have a pair of arcuate fingers 36 separated by a gap 38 and defining a C-shaped bearing surface 40. The forward supports receive the front bushings 14 and the axle 12 therein, the gap 38 and the diameter of the bearing surface 40 being greater in dimension than the diameter of each axle. The rear supports 34 each have a parallel top wall 42 and bottom wall 44, and a connecting rear wall 46. The top, bottom, and rear walls enclose the rear bushings 18 on three sides thereof as shown.

Referring to FIGS. 2 and 3, the forward bushing 14, disposed between the forward supports 32 of the pallet 10 and the axle 12, and the rear bushing 18, disposed between the rear supports 34 and axle 16, are shown. Each of the first and second bushings are comprised of a first half 48 and a second half 50.

Referring to FIGS. 2a, and 2c, the forward bushing has: a cylindrical body 52 disposed along an axis 54 and having a first end portion 56 and a second end portion 58; a first flange 60 extending radially outwardly from the first end portion 56; a second flange 62 disposed in parallel to the axis and extending from the first flange 60 to the second end portion 56, and a interior bearing surface 64 for supporting the axle 12.

Referring to FIGS. 2b and 2d, the first half 48 of each bushing has four detents 66 each engaging an orifice 68 (or a slot or the like) in the second half 50 of the bushing. The detents and orifices are shaped, as one of ordinary skill will readily appreciate, so that the halves of the bushing may be snap-fitted together. The first half of the bushing has a longitudinal projection 70 for engaging a slot 72 in the second half of the bushing. Each half of the bushing has an opening 74, which, when the two halves are fitted together, cooperate to form a cavity. The first half has a protruding porch 76 having a pair of side portions 78 and a bottom portion 80. The porch extends within the opening 74 of the second half of the bushing. Each half has an indentation 82 extending from the opening to the inner surface of the half. The indentations align when the two halves are snap fitted together to form a channel between the opening and the inner surface.

Referring to FIGS. 3a and 3b, the rear bushing 18 for use with the rear supports 34 is shown. The rear bushing is in all respects similar to the front bushing except that the exterior of the rear bushing is rectangularly shaped to fit within the walls that define the rear supports. Because of the rectangular shape, the rear bushing will not rotate relative to the pallet. One of ordinary skill in the art will readily appreciate that the shape of the bushing cooperates with the shape of the bearing surface to prevent rotation of the bushing relative to the bearing surface. As such, other shapes may be utilized and not depart from the scope of this invention.

The front and rear bearings are injection molded and are constructed of a modified, heat stabilized polyamide (Nylon).

In operation, grease is loaded upon the porch 76 of the first half 48 of both the forward and rear bushings. Both sides of the each respective bushing are disposed about a respective axle. The porch 76, the detents 66, and the projection 70 of the first half of the bushing are aligned respectively with the opening 74, the orifices 68 and the slot 72 in the second half of the bushing. The two halves are then snap-fitted together about the axle. The rear bushing is disposed between the walls 42, 44, 46 of the rear support. The body of the forward bushing 14 is then disposed between the bearing surface 40 and the axle 12 such that the first flange 60 abuts the forward support arms and such that the second flange 62 extends into the gap 38 between the fingers. A clamp 82 is then disposed against the first flange 60 to prevent the forward bushing from moving axially inwardly. The rear bushing is prevented from axial movement by contact with the inner link 22 and the second end portion 58 of a forward bushing disposed within a trailing second pallet (not shown) or the fingers 36.

Although the invention has been shown and described with regard to a particular embodiment, it should be understood that various changes and additions could be made therein and thereto without departing from the spirit and scope of the invention.

What is claimed is:

1. An assembly for mounting an escalator or people mover step or pallet to a drive chain, said assembly comprising:
    a shaped surface attaching to said step or pallet,
    an axle for rotatably supporting said step or pallet, said axle being received within said shaped surface, said axle attaching to and being driven by said drive chain, and
    a bearing disposed between said axle and said shaped surface, said bearing having;
        an internal bearing surface for supporting said axle,
        an external shape for cooperating with said shaped surface such that said bearing does not rotate relative to said shaped surface, and
        a first mating portion and a second mating portion, said first and second mating portions cooperating such that said bearing may be inserted between, and removed from between, said bearing surface and about said axle without detaching said axle from said chain.

2. The assembly of claim 1 wherein said bearing further comprises:
    a cavity disposed within said first and second mating portions for receiving lubrication, said cavities aligning with each other upon assembly of said first and second mating portions of the bearing, and
    a channel for communicating lubrication from said cavity to said internal bearing surface.

3. The assembly of claim 2 wherein one of said mating portions further comprises:
    a means extending from said cavity of one of said mating portions for aligning said cavity of one of said mating portions with said cavity of the other of said mating portions, and for loading said lubrication thereupon prior to assembling said bearing about said axle.

4. The assembly of claim 1 wherein said bearing is comprised of polyamide.

5. The assembly of claim 1 wherein said assembly further comprises:
    a pair of fingers defining said bearing surface as having a C-shape, said fingers being separated by a gap, and
    sad bearing having a cylindrical body mating with said C-shaped bearing surface and having an axial flange disposed within said gap for preventing rotation of said bearing relative to said bearing support.

6. The assembly of claim 1 wherein said assembly further comprises:
    said shaped surface having three attached walls, each wall arranged perpendicularly to an adjacent wall, and
    said bearing having a rectangular body for mating within said attached walls, said walls preventing rotation of said bearing relative to said bearing support.

* * * * *